United States Patent
Ben Rached et al.

(10) Patent No.: US 7,359,729 B2
(45) Date of Patent: Apr. 15, 2008

(54) METHOD OF CONTROLLING THE RELATIVE POWER OF RADIO SIGNALS TRANSMITTED IN MACRODIVERSITY MODE AND A RADIO NETWORK CONTROLLER FOR IMPLEMENTING THE METHOD

(75) Inventors: Nidham Ben Rached, Paris (FR); Thierry Lucidarme, Montigny le Bretonneux (FR)

(73) Assignee: Alcatel Lucent, Paris (FR)

( * ) Notice: Subject to any disclaimer, the term of this patent is extended or adjusted under 35 U.S.C. 154(b) by 611 days.

(21) Appl. No.: 10/859,663

(22) Filed: Jun. 3, 2004

(65) Prior Publication Data

US 2004/0266472 A1  Dec. 30, 2004

(30) Foreign Application Priority Data

Jun. 27, 2003  (FR)  ................................... 03 07795

(51) Int. Cl.
*H04B 7/00* (2006.01)
*H04Q 7/20* (2006.01)

(52) U.S. Cl. .................. 455/522; 455/101; 455/127.1; 370/311

(58) Field of Classification Search ................ 455/522, 455/101, 127.1; 370/311
See application file for complete search history.

(56) References Cited

U.S. PATENT DOCUMENTS

| | | | | |
|---|---|---|---|---|
| 5,278,992 A | * | 1/1994 | Su et al. ........................ | 455/69 |
| 5,564,075 A | * | 10/1996 | Gourgue ....................... | 455/69 |
| 5,771,451 A | * | 6/1998 | Takai et al. ................... | 455/442 |
| 5,978,657 A | | 11/1999 | Suzuki et al. | |
| 6,167,259 A | * | 12/2000 | Shah ............................ | 455/424 |
| 6,628,956 B2 | * | 9/2003 | Bark et al. ................... | 455/522 |
| 6,650,906 B1 | * | 11/2003 | Bousquet et al. ........... | 455/522 |
| 6,898,437 B1 | * | 5/2005 | Larsen et al. ................ | 455/522 |
| 6,912,405 B2 | * | 6/2005 | Hiramatsu et al. .......... | 455/522 |

(Continued)

FOREIGN PATENT DOCUMENTS

EP  0 949 768  10/1999

(Continued)

OTHER PUBLICATIONS

Technical specification TS 25.214, "Physical Layer procedures (FDD)", Version 3.6.0 published by the 3GPP in Mar. 2001.

(Continued)

*Primary Examiner*—Lana Le
*Assistant Examiner*—Ping Y Hsieh
(74) *Attorney, Agent, or Firm*—Sughrue Mion, PLLC

(57) ABSTRACT

The radio network controller estimates respective attenuation ratios of radio signals received by a terminal from transmitters of an active set. It commands at least some of the transmitters of the active set to transmit to the terminal with respective powers such that the difference $p_i - p_j$ between the respective transmission powers $p_i$ and $p_j$ of two transmitters i and j is substantially proportional to $$\frac{1}{L_j} - \frac{1}{L_i},$$

where $L_i$ and $L_j$ designate the attenuation ratios estimated for the transmitters i and j, respectively.

9 Claims, 5 Drawing Sheets

U.S. PATENT DOCUMENTS

| | | | |
|---|---|---|---|
| 6,920,329 B2 * | 7/2005 | Kennedy et al. | 455/456.1 |
| 7,155,249 B2 * | 12/2006 | Sarkar et al. | 455/522 |
| 7,194,280 B2 * | 3/2007 | Vanghi | 455/522 |

FOREIGN PATENT DOCUMENTS

| | | |
|---|---|---|
| GB | 2 358 109 | 7/2001 |
| WO | 0141382 | 6/2001 |
| WO | 02 102109 | 12/2002 |

OTHER PUBLICATIONS

Technical specification 3G TS 25.215, "Physical layer—Measurements (FDD)", Version 3.3.0 published by the 3GPP in Jun. 2000.

Technical specification 3G TS 25.212, "Multiplexing and channel coding (FDD)", Version 3.3.0 published by the 3GPP in Jun. 2000.

Technical specification 3G TS 25.213, "Spreading and modulation (FDD)", Version 3.2.0 published by the 3GPP in Mar. 2000.

Technical specification 3G TS 25.433, "UTRAN Iub Interface NBAP Signalling", Version 4.1.0 published by the 3GPP in Jun. 2001.

Technical specification 3G TS 25.211, "Physical channels and mapping of transport channels onto physical channels (FDD)", Version 3.3.0 published by the 3GPP in Jun. 2000.

Technical specification TS 25.331, "RRC Protocol Specification", Version 4.1.0 published by the 3GPP in Jun. 2001.

Technical specification 3G TS 25.301, "Radio Interface Protocol", Version 3.4.0 published by the 3GPP in Mar. 2000.

Technical specification 3G TS 25.401, "UTRAN Overall Description", Version 3.1.0 published by the 3GPP in Jan. 2000.

* cited by examiner

METHOD OF CONTROLLING THE RELATIVE POWER OF RADIO SIGNALS TRANSMITTED IN MACRODIVERSITY MODE AND A RADIO NETWORK CONTROLLER FOR IMPLEMENTING THE METHOD

The present invention relates to the macrodiversity techniques used in cellular radio networks. In particular, it finds an application in spread spectrum cellular networks using code division multiple access (CDMA) techniques, for example in third generation networks of the Universal Mobile Telecommunication System (UMTS) type.

BACKGROUND OF THE INVENTION

Spectrum spreading allows for multiple propagation paths between the transmitter and the receiver, which achieves an appreciable reception diversity gain.

One receiver conventionally used for this purpose is the "rake" receiver, which comprises a number of fingers operating in parallel to estimate the digital symbols transmitted. The reception diversity gain is the result of combining estimates obtained in the various fingers of the receiver.

In a spread spectrum CDMA system, the symbols transmitted, which are generally binary symbols (±1) or quaternary symbols (±1 ±j), are multiplied by spreading codes comprising samples, called chips, whose timing rate is higher than that of the symbols by a ratio called the spreading factor. Orthogonal or quasi-orthogonal spreading codes are assigned to different channels sharing the same carrier frequency, to enable each receiver to detect the sequence of symbols that is addressed to it by multiplying the received signal by the corresponding spreading code.

In cellular systems, the fixed transceiver serving a given cell generally transmits a beacon signal on a pilot channel which is assigned a particular pilot spreading code. The spreading code is communicated to the mobile terminals in or near the cell by means of system information broadcast by the base stations. The terminals measure the power at which the pertinent pilot codes are received. These measurements enable mobiles on standby to identify the best cell to use for random access, should this be necessary. They also identify, during a call, the cell or cells offering the best radio link conditions for a handover (intercellular call transfer), should this be necessary.

One feature of spread spectrum CDMA systems is the ability to support a macrodiversity mode. Macrodiversity consists in enabling a mobile terminal to communicate simultaneously with different fixed transceivers of an active set. In the downlink, the mobile terminal receives the same information several times. In-the uplink, the radio signal transmitted by the mobile terminal is picked up by the fixed transceivers of the active set to produce different estimates which are then combined in the network.

By combining different observations of the same information, macrodiversity achieves an improvement in reception that enhances the performance of the system.

It also enables soft handover (SHO) if the mobile terminal is moving around.

In a CDMA system, such as the UMTS, the power transmitted over the radio interface is adjusted by a control procedure in which the receiver sends transmission power commands (TPC) back to the transmitter with the aim of achieving target reception conditions. The transmission power commands consist of bits sent at a relatively high rate and whose value indicates if the transmission power must be increased or reduced.

In the case of a macrodiversity call, the fixed transceivers of the active set receive identical TPC bits from the mobile terminal. Respective corrective terms may be taken into account by the fixed transceivers to balance the power transmitted. For the same total power transmitted relative to a logical channel, i.e. for a given level of interference, the balancing of the powers transmitted is not optimized in terms of the error rate observed in the symbols transmitted.

An object of the present invention is to provide a more satisfactory solution.

SUMMARY OF THE INVENTION

The invention therefore proposes a method of controlling the power of radio signals transmitted in macrodiversity mode to a radio terminal from a plurality of radio transmitters of an active set. The method comprises the steps of:
  estimating respective attenuation ratios of radio signals received by the terminal from the transmitters of the active set; and
  controlling at least some of the transmitters of the active set to transmit to the terminal at respective powers such that the difference $p_i - p_j$ between the respective transmission powers $p_i$ and $p_j$ of two transmitters i and j is substantially proportional to $$\frac{1}{L_j} - \frac{1}{L_i},$$

where $L_i$ and $L_j$ designate attenuation ratios estimated for transmitters i and j, respectively.

This way of distributing the power to be transmitted to the terminal has the advantage of taking account of the different attenuations on the different radio links. This results in improved overall reception conditions, and therefore improved use of network resources, compared to the situation in which the powers are systematically balanced.

In particular, in a preferred embodiment, it can be shown that the method yields an optimum bit error rate (BER) if the transmitters i and j are controlled so that the difference $p_i - p_j$ between their respective transmission powers is substantially equal to $$N0 \cdot \left(\frac{1}{L_j} - \frac{1}{L_i}\right),$$

where N0 is an estimate of the power of the noise received by the receiving radio terminal.

The invention also proposes a radio network controller adapted to implement the above method. For a cellular radio network infrastructure, a controller of the invention comprises means for communicating with fixed radio transmitters serving respective cells and with at least one radio terminal and means for controlling the radio resources assigned to a call between the terminal and a plurality of radio transmitters belonging to an active set. The radio resource control means comprise means for estimating respective attenuation ratios of radio signals received by the terminal from the transmitters of the active set after measurements relating to the conditions of reception of said radio signals by the terminal and means for controlling at least some of the transmitters of the active set so that they transit to the terminal at respective powers such that the difference $p_i-p_j$ between the respective transmission powers $p_i$ and $p_j$ of two transmitters i and j is substantially proportional to $$\frac{1}{L_j} - \frac{1}{L_i},$$

where $L_i$ and $L_j$ designate the estimated attenuation ratios for the transmitters i and j, respectively.

DETAILED DESCRIPTION OF PREFERRED EMBODIMENTS

Figure 1:
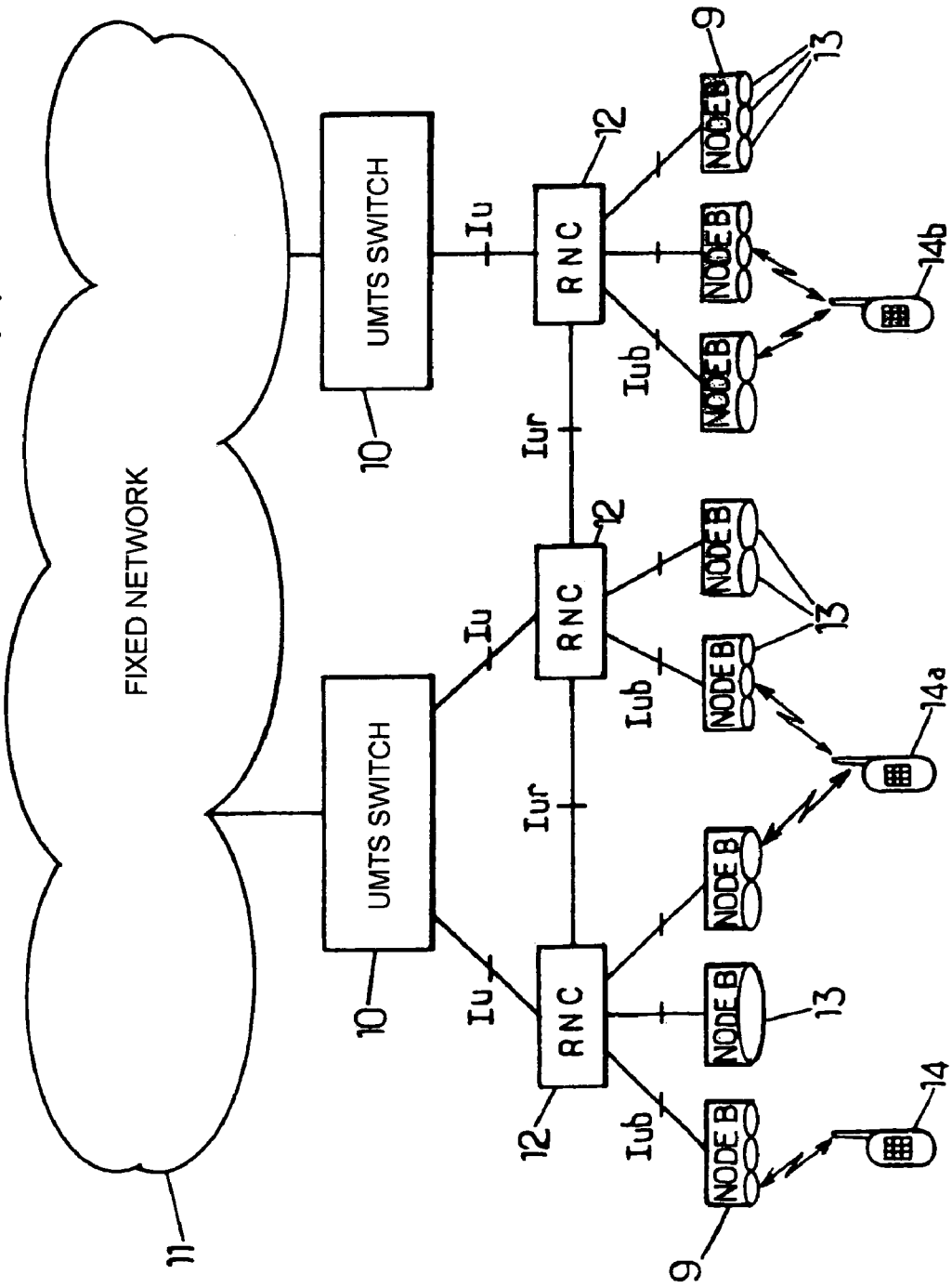
FIG. 1 is a diagram of a UMTS network.

An application of the invention to a UMTS network whose architecture is shown in FIG. 1 is described hereinafter.

Mobile service switches 10 belonging to a core network (CN) are connected to one or more fixed networks 11 and, via an Iu interface, to control units 12 called radio network controllers (RNC). Each RNC 12 is connected to one or more base stations 9 via an Iub interface. Base stations 9 distributed over the coverage territory of the network are able to communicate by radio with mobile terminals 14, 14a, 14b. A mobile terminal is also called a user equipment (UE). Each of the base stations 9, also called a Node B, may serve one or more cells by means of respective transceivers 13. Certain RNC 12 may further communicate with each other via an Iur interface. The RNC and the base stations form a UMTS terrestrial radio access network (UTRAN).

The UTRAN comprises elements from layers 1 and 2 of the ISO model to provide the required links over the radio interface (Uu) and a radio resource control (RRC) stage 15A belonging to the layer 3, as described in Technical Specification 3G TS 25.301, "Radio Interface Protocol", version 3.4.0, published in March 2000 by the 3$^{rd}$ Generation Partnership Project (3GPP). Seen from higher layers, the UTRAN simply acts as a relay between the UE and the CN.

Figure 2:
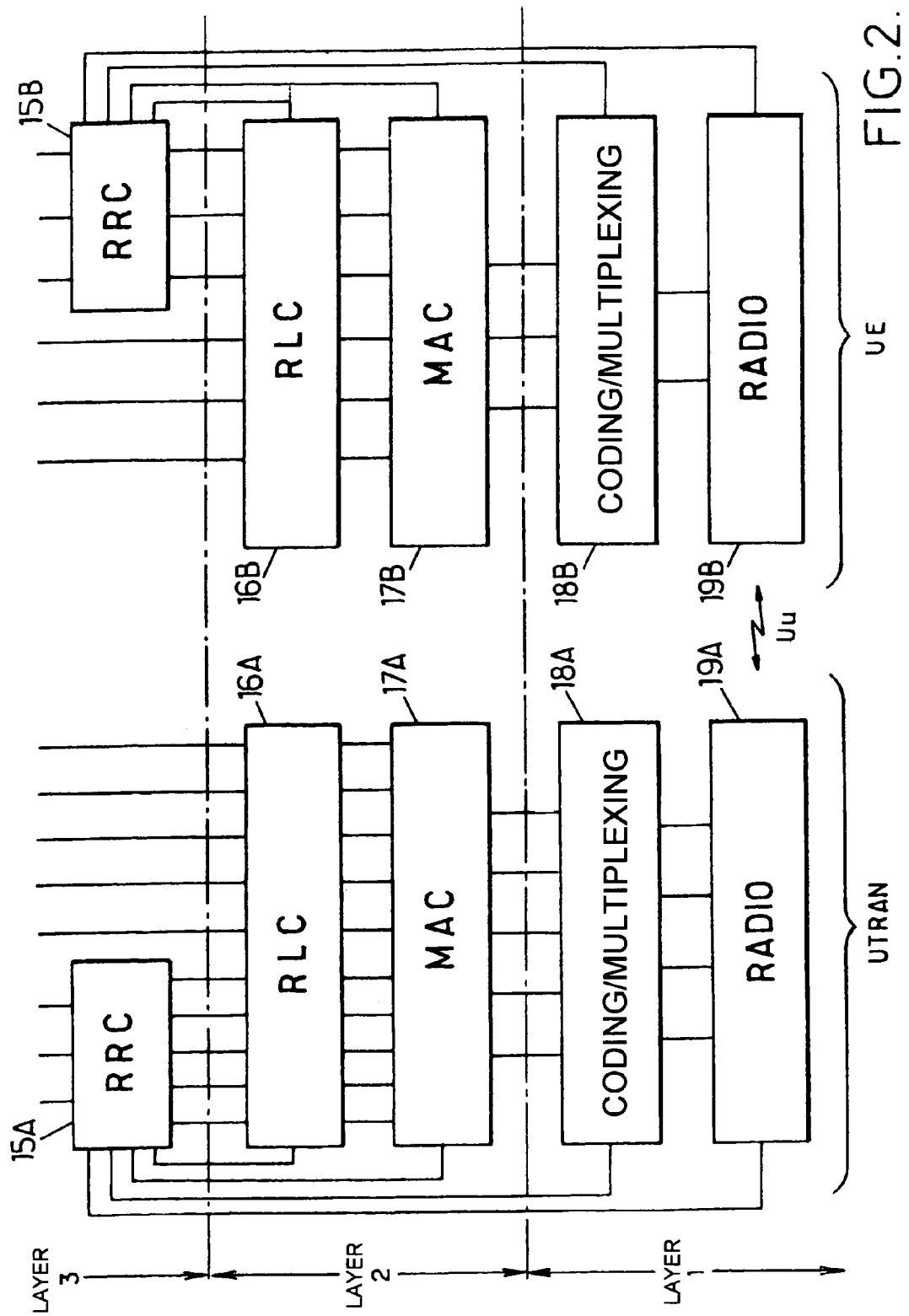
FIG. 2 is a diagram showing the communication protocol layer organization employed over the radio interface of the UMTS network.

FIG. 2 shows the RRC stages 15A, 15B and the stages of the lower layers of the UTRAN and a UE. On each side the layer 2 is divided into a radio link control (RLC) stage 16A, 16B and a medium access control (MAC) stage 17A, 17B. The layer 1 comprises a coding and multiplexing stage 18A, 18B. A radio stage 19A, 19B transmits radio signals based on streams of symbols provided by the stage 18A, 18B and receives signals transmitted in the opposite direction.

There are various ways to adapt the protocol architecture of FIG. 2 to the hardware architecture of the FIG. 1 UTRAN, and as a general rule different organizations may be adopted according to the types of channels (see section 11.2 of Technical Specification 3G TS 25.401, "UTRAN Overall Description", version 3.1.0, published in January 2000 by the 3GPP). The RRC, RLC and MAC stages are in the RNC 12. The layer 1 is in the Node B 9, for example. A portion of this layer may be in the RNC 12, however.

If a plurality of RNC are involved in a call with a UE, there is generally a serving RNC (SRNC) containing the modules relating to layer 2 (RLC and MAC) and at least one relay RNC, also called a drift RNC (DRNC), to which is connected a base station 9 with which the UE is in radio communication. Appropriate protocols are used for exchanges between these RNC over the Iur interface, for example the Asynchronous Transfer Mode (ATM) and the ATM Adaptation Layer No.2 (AAL2). The same protocols may be used for exchanges between a Node B and its RNC over the Iub interface.

Each of the layers 1 and 2 is controlled by the RRC sub-layer, the characteristics of which are described in Technical Specification TS 25.331, "RRC protocol specification", version 4.1.0, published in June 2001 by the 3GPP. The RRC stage 15A, 15B supervises the radio interface. It also processes streams to be transmitted to the remote station in accordance with a control plan, as opposed to a user plan, which corresponds to the processing of layer 3 user data.

The UMTS uses the spread spectrum CDMA technique, i.e. the symbols transmitted are multiplied by spreading codes consisting of samples called chips whose timing rate (3.84 Mchip/s in the case of the UMTS) is higher than that of the symbols transmitted. The spreading codes distinguish different physical channels (PhCH) which are superposed on the same transmission resource (carrier frequency). The autocorrelation and intercorrelation properties of the spreading codes enable the receiver to separate the PhCH and to extract from them the symbols addressed to it.

In the UMTS, in the frequency division duplex (FDD) mode on the downlink, a scrambling code is assigned to each transceiver 13 of each base station 9, and different physical channels used by the transceiver are distinguished by mutually orthogonal channelization codes. The transceiver 13 may also use a plurality of mutually orthogonal scrambling codes, one of which is a primary scrambling code. On the uplink, the transceiver 13 uses the scrambling code to separate the sending UEs and, where applicable, uses the channelization code to separate physical channels from the same UE. The overall spreading code for each PhCH is the product of the channelization code and the scrambling code. The spreading factor (which is equal to the ratio between the chip rate and the symbol rate) is a power of 2 from 4 to 512, and is chosen as a function of the bit rate of the symbols to be transmitted on the PhCH.

The physical channels are organized into 10 ms frames that follow on in sequence on the carrier frequency used. Each frame is divided into 15 timeslots each of 666 microseconds (μs) duration. Each slot is able to carry the superposed contributions of one or more physical channels, comprising common channels and dedicated physical channels (DPCH).

On the downlink, one of the common channels is a common pilot channel (CPICH). It carries a pilot signal, also called a beacon signal, formed from a predetermined sequence of symbols (see Technical Specification 3G TS 25.211, "Physical channels and mapping of transport channels onto physical channels (FDD)", version 3.3.0, published in June 2000 by the 3GPP). This signal is transmitted by the transceiver 13 using the primary scrambling code of the cell and a particular channelization code.

Figure 3:
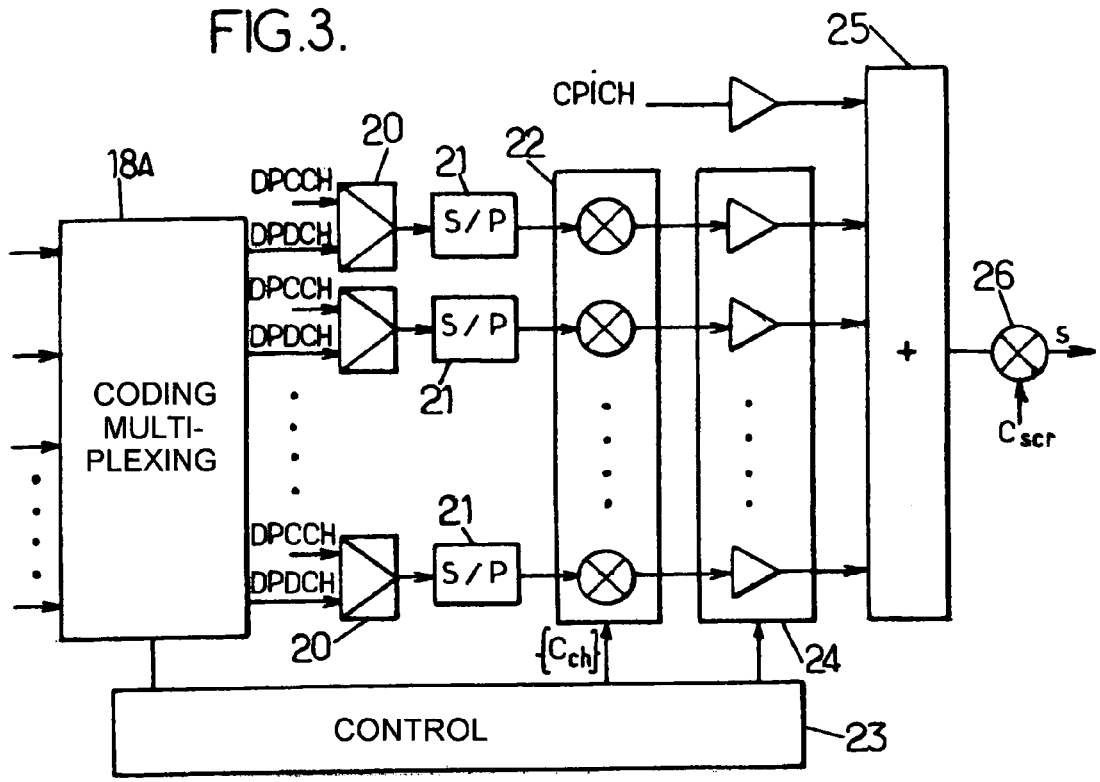
FIG. 3 is a block diagram of the transmitter portion of a radio transceiver of a UMTS base station.

FIG. 3 shows diagrammatically the transmitter portion of a fixed transceiver 13 of a UMTS base station serving a cell using a scrambling code $c_{scr}$. The layer 1 is able to multiplex a plurality of transport channels (TrCH) from the sub-layer MAC onto one or more PhCH. The module 18A receives the data streams of the downlink TrCH from the RNC and applies to them the coding and multiplexing operations required to form the data portion (DPDCH) of the DPCH to be transmitted. These coding and multiplexing functions are described in detail in Technical Specification 3G TS 25.212, "Multiplexing and channel coding (FDD)", version 3.3.0, published in June 2000 by the 3GPP.

The data portion DPDCH is time division multiplexed in each 666 ms time slot with a control portion (DPCCH) containing control information and predetermined pilot symbols, as symbolized in FIG. 3 by the multiplexers 20 that form binary streams of DPCH. A serial/parallel converter 21 on each channel forms a complex digital signal whose real part consists of the even ranked bits of the stream and whose imaginary part consists of the odd ranked bits. The module 22 applies to these complex signals the respective channelization codes cCh assigned by a control unit 23. The module 24 weights the resulting signals in accordance with the respective transmission powers of the physical channels, as determined by a power control process.

The complex signals of the various channels are then summed by the adder 25 before being multiplied by the scrambling code $c_{scr}$ of the cell by the module 26. The adder 25 also receives the contribution of the CPICH, which is not multiplied by a channelization code because the channelization code of the CPICH is constant and equal to 1 (see Technical Specification 3G TS 25.213, "Spreading and modulation (FDD)", version 3.2.0, published in March 2000 by the 3GPP). The complex baseband signal s delivered by the module 26 is fed through a shaping filter and converted to analogue form before it modulates the carrier frequency using the quadrature phase shift keying (QPSK) technique and is amplified and transmitted by the base station.

The transmission resources of the transceiver 13 are assigned to the channels by the unit 23 under the control of the RRC 15A in the RNC. The corresponding control messages are transmitted using a transceiver control application protocol called the Node B Application Protocol (NBAP); see 3G Technical Specification TS 25.433, "UTRAN Iub Interface NBAP Signaling", version 3.2.0, published in June 2001 by the 3GPP.

Figure 4:
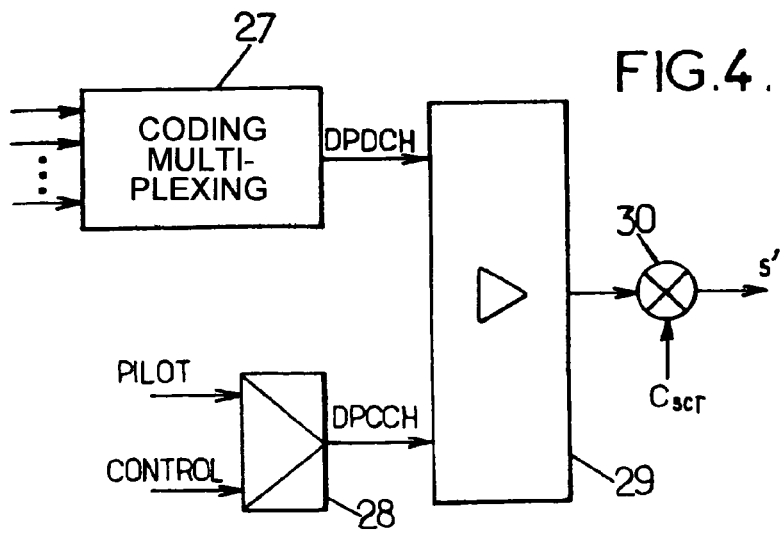
FIG. 4 is a block diagram of the transmitter portion of a UMTS mobile terminal.

FIG. 4 shows diagrammatically the transmitter part of a UE. It is assumed that this UE transmits on a single physical channel. The module 27 handles the coding and where applicable the multiplexing of the TrCH corresponding to a physical channel. This forms a real signal (DPDCH) that is transmitted on a channel I. In parallel with this, control information and pilot symbols are assembled by a module 28 to form a real signal (DPCCH) that is transmitted on a channel Q. The digital signals on the channels I and Q form the real and imaginary parts of a complex signal whose transmission power is adjusted by a module 29. The resulting signal is modulated by the spreading code of the channel, consisting of a scrambling code $c_{scr}$; this is represented by the multiplier 30. The resulting complex baseband signal s' is then filtered and converted to analogue form before it QPSK modulates the carrier frequency.

Figure 5:
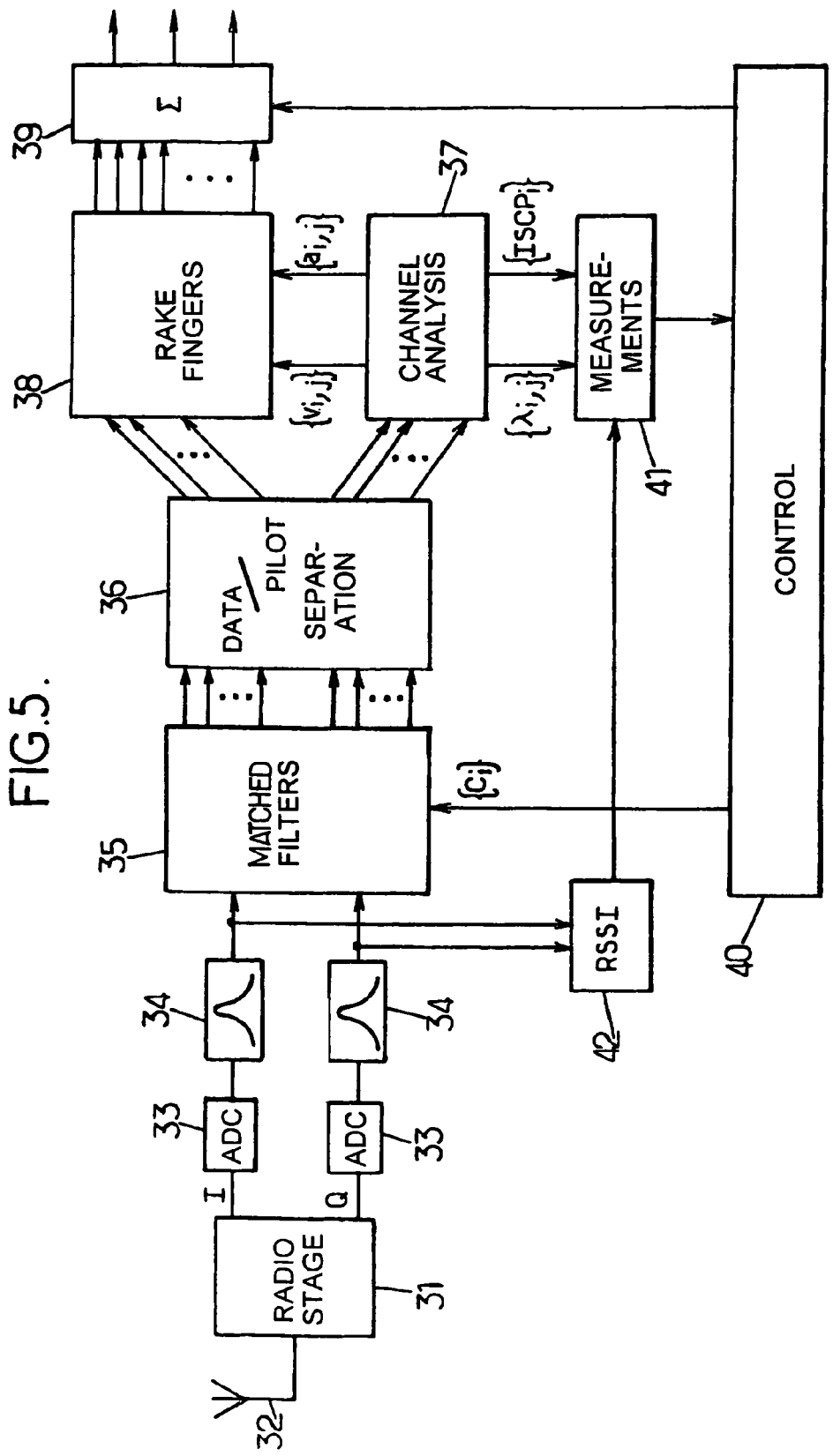
FIG. 5 is a block diagram of a receiver of a UMTS station.

FIG. 5 is a block diagram of a CDMA receiver that may be included in a UE for a downlink or in a Node B for an uplink. The receiver comprises a radio stage 31 that applies the required analogue processing to the radio signal captured by an antenna 32. The radio stage 31 delivers a complex analogue signal whose real and imaginary parts are digitized by analogue-to-digital converters 33 on respective processing channels I and Q. On each channel, a filter 34 adapted to shape the pulses sent by the transmitter produces a digital signal at the chip rate of the spreading codes.

These digital signals are submitted to a set of matched filters 35. The filters 35 are adapted to the spreading codes $c_i$ of the channels to be taken into consideration. The spreading codes $c_i$ (the products of a scrambling code and where applicable a channelization code) are supplied to the matched filters 35 by a control module 40 which in particular manages the assignment of the resources of the receiver. On the Node B side, the control module 40 is supervised by the RRC stage 15A of the RNC using the NBAP protocol. On the UE side, the control module 40 is supervised by the RRC stage 15B.

For the N physical channels (spreading codes) that are taken into account, the matched filters 35 deliver to a module 36 for separating the data and pilot signals N real signals on the channel I and N real signals on the channel Q. For the downlinks, this separation consists in extracting the portions of the time slots containing the complex pilot signals sent by the Node B in order to supply them to the module 37 for analyzing the channels, the corresponding data being addressed to the fingers 38 of the rake receiver. For the uplinks, the separation effected by the module 36 consists in extracting the real pilot signals from the channel Q relating to each channel in order to supply them to the analyzer module 37.

For each physical channel, denoted by an integer subscript i, the analyzer module 37 identifies a certain number of propagation paths, denoted by a subscript j, on the basis of the portion of the output signal of the matched filter 35 corresponding to the pilot symbols, which constitutes sampling the impulse response of the channel.

There are different ways to represent the propagation paths for the rake receiver. One method consists in looking for maxima in the impulse response of the channel sampled at the output of the matched filter 35, averaged over a period of the order of one hundred milliseconds. Each propagation path is then represented by a time-delay $t_{i,j}$ corresponding to one of the maxima, of instantaneous amplitude $a_{i,j}$. In this case, the processing effected in each finger 38 of the rake receiver, assigned to the path j of the channel i, consists of sampling the signal received on the channel i with the time-delay $t_{i,j}$ and multiplying the result by $a_{i,j}*$. The paths selected are those for which the receive energies are the highest, the receive energy along a path j of a channel i being equal to the average of $|a_{i,j}|^2$.

In another possible representation (see WO 01/41382), each propagation path of a channel i is represented by an eigenvector $v_{i,j}$ of the autocorrelation matrix of the impulse response vector supplied by the matched filter 35. In the processing effected in the finger 38 of the rake receiver, sampling with the time-delay $t_{i,j}$ is then replaced by the scalar product of the output vector of the matched filter 35 and the eigenvector $v_{i,j}$. To estimate the eigenvectors $v_{i,j}$, the analyzer module 37 diagonalizes the autocorrelation matrix, which also supplies the associated eigenvalues $\lambda_{i,j}$. The eigenvalue $\lambda_{i,j}$, which is equal to the mathematical esperance of $|a_{i,j}|^2$, represents the energy of the signal received on the path j of the channel i.

The combination module 39 of the rake receive receives the contributions of the fingers 38 and, for each channel i, calculates the sum of the respective contributions of the paths j retained, as indicated by the control module 40. The result of this is a local estimate of the information symbols transmitted on the channel i.

In the case of a UE receiving downlink signals in macrodiversity mode, i.e. from a plurality of transceivers 13 using different spreading codes, the module 39 may also sum the contributions of the corresponding propagation channels to obtain the diversity improvement. The resulting combined estimates are then submitted to the decoding and demultiplexing stage (not shown in FIG. 5).

In the case of a base station 9 receiving on a plurality of transceivers 13 uplink signals from the same mobile terminal in macrodiversity mode, the local estimates delivered by the respective combiner modules 39 of the transceivers 13 are also combined to obtain the diversity improvement.

In the case of uplink macrodiversity between a plurality of base stations 9 receiving signals from the same mobile terminal, the local estimates delivered by the respective combiner modules 39 of the transceivers 13 are submitted to the decoding and demultiplexing stage (not shown in FIG. 5) to obtain the estimated symbols of the or each TrCH concerned. These symbols are sent to the SRNC via the Iub (Iur) interface, where they are combined to obtain the diversity improvement.

The corresponding combiner module 50 of the RNC 12 (FIG. 6) recovers over the Iub and/or Iur interface 51 the symbols of the TrCH coming from the various base stations and supplies them to the MAC stage 17A after combining them. In the downlink, this physical layer module 50 is responsible for broadcasting the streams of TrCH coming from the MAC stage 17A to the base stations concerned.

Figure 6:
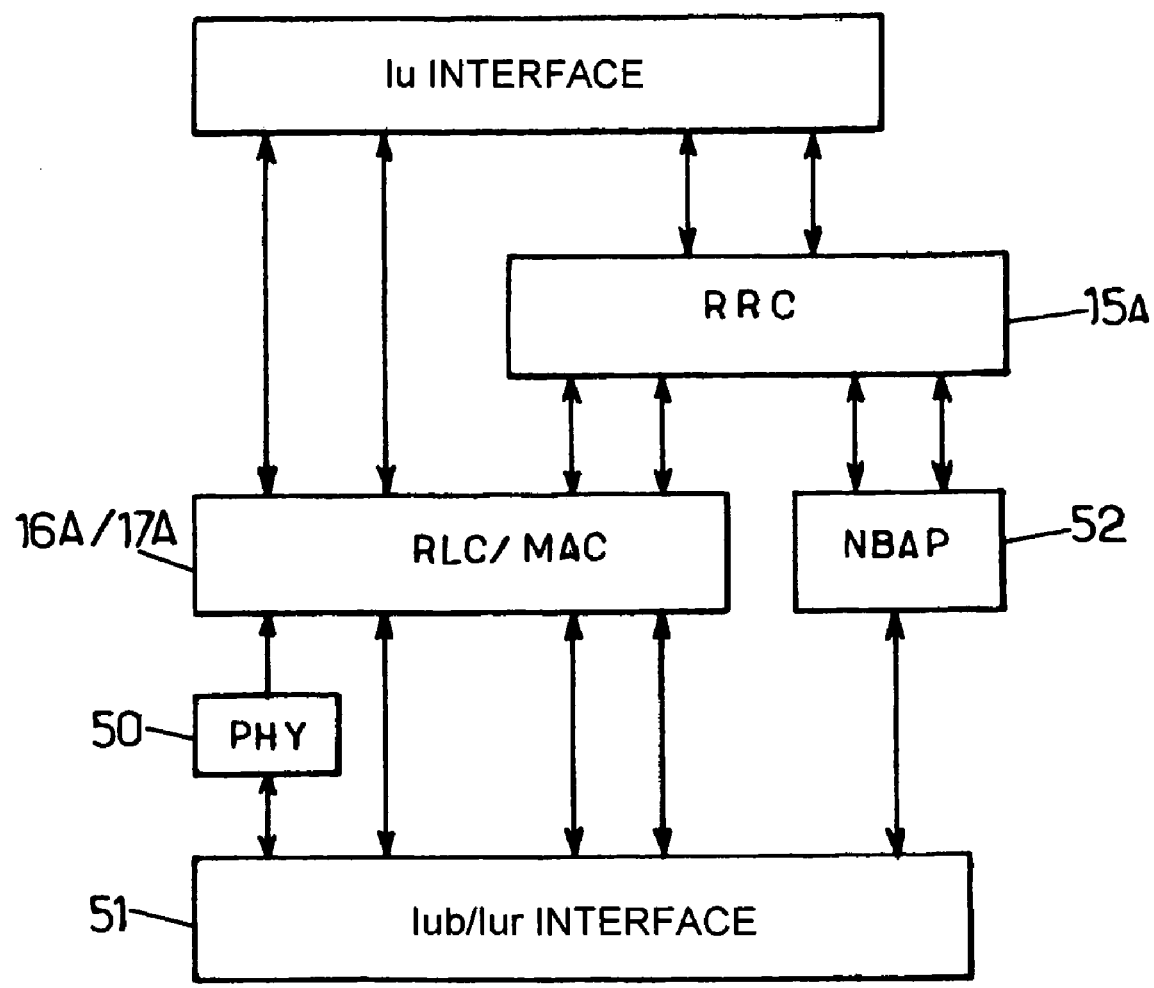
FIG. 6 is a block diagram of a UMTS radio network controller.

FIG. 6 also shows diagrammatically one instance 52 of the NBAP protocol executed at the level of the RNC 12 to control a remote base station. The dialogue between the RRC stage 15A of the RNC and that 15B of a UE is effected by means of an RRC connection managed as described in section 8.1 of the Technical Specification 3G TS 25.331 cited above.

The procedures of the RRC protocol comprise measuring procedures described in section 8.4 of the Technical Specification 3G TS 25.331, which are used in particular to update the active set for the macrodiversity (or SHO) UEs and to adjust the transmission powers of the transceivers of the active set. The measurements that the RNC requires from the UEs are requested in MEASUREMENT CONTROL messages which also indicate the reporting modes, for example with a specified period or in response to certain events. The measurements specified by the RNC are then effected by the UE, which sends them back over the RRC connection in MEASUREMENT REPORT messages (see 3G TS 25.331, sections 10.2.17 and 10.2.19). The MEASUREMENT CONTROL and MEASUREMENT REPORT messages are relayed transparently by the transceivers 13 of the base stations.

The SRNC may use a plurality of non-standardized algorithms to determine the transceivers 13 of the active set.

In certain cases, the algorithms for determining the active set may take account of uplink measurements effected by the transceivers 13 of the base stations and sent back in accordance with the NBAP procedures described in sections 8.3.8 to 8.3.11 of the Technical Specification 3G TS 25.433 cited above. The RNC indicates the measurements that it requires to the Node B in a DEDICATED MEASUREMENT INITIATION REQUEST message and the Node B sends them back in a DEDICATED MEASUREMENT REPORT message (see 3G TS 25.433, sections 9.1.52 and 9.1.55).

The modifications of the active set are notified to the UE (control module 40 of the receiver) by means of procedures for updating the SHO active set of the RRC protocol, as described in section 8.3.4 of Technical Specification 3G TS.25.331 (ACTIVE SET UPDATE message, section 10.2.1).

These modifications also lead to the transmission of signaling from the RNC to the base stations 9 by means of procedures for setting up, adding, reconfiguring and removing NBAP protocol radio links, as described in section 8 of Technical Specification 3G TS.25.433.

The measurements taken into consideration by the RNC for controlling the SHO radio links comprise power measurements effected on the pilot channels or signals, obtained by a measurement module 41 represented in FIG. 5. Various measurements that the mobile terminals and the base stations must be able to carry out are listed in Technical Specification 3G TS 25.215, "Physical layer—Measurements (FDD)", version 3.3.0, published in June 2000 by the 3GPP. The measurements obtained by the module 41 are sent to the RNC via the control module 40 and the RRC connection (UE measurements) or using the NBAP protocol (Node B measurements).

For a given channel i, the sum of the eigenvalues $\lambda_{i,j}$ determined by the analyzer module 37 for the p paths ($1 \leq j \leq p$) taken into consideration represent the overall energy receive on the channel, reduced to the duration of a symbol. This energy is called the received signal code power (RSCP) in the standard. The analyzer module 37 also determines for each channel i the residual power of noise after processing the p paths. This power is called the interference signal code power (ISCP) in the standard. The quantity (RSCP/ISCP)×(SF/2) represents the signal-to-interferer ratio (SIR) for a downlink channel, SF designating the spreading factor of the channel. For an uplink channel the SIR is equal to (RSCP/ISCP)×SF.

The SIR evaluated from the pilot symbols sent on a dedicated channel is a measurement that the RNC may request from the UE or from the Node B and may be taken into account for managing the active set.

The radio receiver is furthermore capable of measuring the in-band power received around a UMTS carrier. This power, which is measured by a module 42 on the upstream side of the matched filters 35, is indicated by a received signal strength indicator (RSSI). The RNC 12 can request the UE to supply it with the measured RSSI (see 3G 25.331, sections 10.3.7.15 and 10.3.7.21).

The communicating UEs monitor in parallel the powers received on the CPICH of the cells belonging to a monitored set comprising the active set and a certain number of adjoining cells. These power measurements are generally sent back to the RNC in MEASUREMENT REPORT messages. The magnitudes sent back may be absolute powers (CPICH_RSCP) or, and more usually, powers that have been normalized with respect to the power of the received signal (CPICH_Ec/N0=CPICH_RSCP/RSSI).

The RNC may further have the UE send it the downlink attenuation ("pathloss") for each transceiver i, by means of the MEASUREMENT CONTROL and MEASUREMENT REPORT messages of the RRC protocol. This attenuation parameter is the difference in dB between the power transmitted on the primary CPICH by the transceiver i and the parameter CPICH_RSCP measured by the UE (see 3G TS 25.331, section 10.3.7.38). It may also be expressed by the ratio $L_i$ of the power received in watts to the power transmitted in watts ($L_i \leq 1$).

Hereinafter it is assumed that the RNC has, for a downlink dedicated channel:

the attenuation ratios $L_i$ corresponding to the "pathloss" sent back by the UE relating to the cells of the active set;

the power N0 of the noise affecting the receiving UE; to a first approximation, N0 can be taken as equal to RSSI; a more refined estimate may be obtained by the RNC using the following equation, in which $p_i$ is the power transmitted on the channel by the cell i of the active set, which the RNC may have sent to it in accordance with the NBAP protocol (see 3G TS 25.433, sections 9.2.1.23 and 9.2.1.24):

$$N0 = RSSI - \sum_i p_i \cdot L_i$$

For each cell of the active set, $a_i$ denotes the quantity $$a_i = \frac{N0}{L_i}.$$

The downlink bit error rate (BER) with macrodiversity may be approximated by the equation:

$$BER(\{p_i\}) = \frac{1}{2} \cdot \frac{1}{\prod_i (1 + p_i/a_i)}$$

A good distribution of the power between the cells of the active set is obtained by attempting to minimize the BER. Using a Lagrange multiplier K in relation to the constraint $$\sum_i p_i = P,$$

where P designates the total power to be sent to the UE, this amounts to minimizing the following cost function:

$$J = -\sum_i \log(1 + p_i/a_i) + K \cdot \left(P - \sum_i p_i\right)$$

The powers $p_i$ to be transmitted by the various cells are obtained by canceling the partial derivatives $$\frac{\partial J}{\partial P_i},$$

yielding:

$$p_i = (-1/K) - a_i \quad (1)$$

Summing the powers $p_i$ in accordance with equation (1), the following equation is obtained for each cell i of the active set, where n is the number of cells in the active set:

$$\frac{P}{n} = -\frac{1}{K} - \frac{1}{n}\sum_i a_i$$

from which it may be deduced that:

$$p_i = \frac{P}{n} - a_i + \frac{1}{n}\sum_j a_j \quad (2)$$

or (which is equivalent):

$$p_i = \frac{P}{n} - \left(\frac{n-1}{n}\right)a_i + \frac{1}{n}\sum_{j \neq i} a_j \quad (3)$$

Accordingly, knowing the $a_j$ values from the measurements sent back by the UEs and/or the Nodes B, the RNC can evaluate the power differences $p_i$ relative to the mean P/n and control the Nodes B serving the cells of the active set accordingly.

A cell for which equation (2) or (3) yields a relative power $p_i$ is commanded by the RNC not to send to the UE. In other words, we take $p_i = 0$ if:

$$a_i > \frac{1}{n}\left(P + \sum_j a_j\right) \quad (4)$$

or (which is equivalent):

$$a_i > \frac{1}{n-1}\left(P + \sum_{j \neq i} a_j\right) \quad (5)$$

If m cells of the active set verify condition (4), with $m \geq 1$, they are discarded from the active set and the calculation (2) is iterated, substituting n−m for n. This will not normally occur often, because the algorithms defining the active set are adapted to retain only cells offering relatively good propagation conditions, i.e. a pathloss that is not too high (a relatively low value for $a_i$).

The test of condition (4) may also be used in the algorithms for defining the active set. The quantity $$\frac{P}{n} - a_i + \frac{1}{n}\sum_j a_j$$

is sent as a parameter to the procedure for determining the active set. The RNC executing the procedure may in particular eliminate from the active set a cell i for which condition (4) is verified N times in a row, where N is a constant or variable integer parameter (for example N=1). Another possibility is to eliminate a cell i that satisfies the condition with a certain margin M:

$$a_i > \frac{1}{n}\left(P + \sum_j a_j\right) + M \quad \text{or} \quad a_i > \frac{1}{n-1}\left(P + \sum_{j \neq i} a_j\right) + M$$

The RNC uses formula (2) or (3) to adjust the transmission power of the transceivers of the active set vis-a-vis a macrodiversity mobile terminal.

As described in section 5.2 of Technical Specification TS 25.214, "Physical Layer procedures (FDD)", version 3.6.0, published by the 3GPP in March 2001, the power transmitted on the dedicated channel by a transceiver of the active set during the $k^{th}$ 666 μs time slot is controlled by the internal power control loop using the equation:

$$p_j(k) = p_i(k-1) + p_{TPC}(k) + p_{bal}(k) \qquad (6)$$

where $p_{TPC}(k) = \pm\Delta_{TPC}$ according to the TPC bits received from the UE. The corrective term $p_{bal}(k)$ is determined from a reference power $P_{ref}$ communicated to the Node B by the RNC in a DL POWER CONTROL REQUEST message of the NBAP protocol (see 3G TS 25.433, section 8.3.7). Over the time slots k of an adjustment period, the node B takes:

$$\sum_k p_{bal}(k) = (1-r) \cdot (p_{ref} + p_{P-CPICH} - P_{init}) \qquad (7)$$

The duration of the adjustment period (one or more 10 ms frames) and the adjustment coefficient r are also specified by the RNC in the DL POWER CONTROL REQUEST message. The quantity $P_{P-CPICH}$ represents the transmission power on the primary CPICH of the cell, relative to which the value $P_{ref}$ is expressed, and $P_{init}$ represents the transmission power on the dedicated channel during the last time slot of the preceding adjustment period.

The power is usually split in a balanced manner between the transceivers of the active set, i.e. values of Pref are taken that all correspond to the average power P/n. After convergence of the power balancing process (7) ($P_{bal}(k) \approx 0$), the power transmitted $p_i(k)$ fluctuates in accordance with the TPC bits around a value that is initially approximately equal to $P_{ref} + P_{P-CPICH}$ and then evolves as a function of the external power control loop. This external loop adjusts relatively slowly a target value $SIR_{target}$ for the SIR observed by the UE as a function of reception quality in terms of the block error rate (BLER). The internal loop generates TPC bits determined so that they tend to align the observed SIR with the target $SIR_{target}$. If the external loop modifies the total power transmitted, the balancing term $P_{bal}(k)$ resulting from (7) also slightly offsets the transmitted power according to (6), but the TPC bits rapidly compensate this drift. The process as a whole controls the transmitted power to comply with the balancing condition, and also prevents any errors in the reception of the TPC bits by certain Nodes B disturbing the balance.

The total power P to be transmitted may be determined in various ways. On setting up the channel, there is normally only one cell in the active set. The corresponding Node B may begin to send at an arbitrary power, for example in the middle of a power range that is assigned to it. Another possibility is for the RNC to tell it the initial power to be used, determined as a function of a target value for the ratio Eb/N0 of the energy per bit to noise, depending on the service required. The internal and external loops then rapidly cause the power to converge toward an appropriate value. If an $n^{th}$ cell is added to the active set ($n \geq 2$), the RNC interrogates the Nodes B of the n−1 other cells using the NBAP protocol to find out the powers they are currently transmitting on the code assigned to the channel (over a period of a few frames, for example). The sum of the powers obtained in this way constitutes the value of P for the calculations (2)-(5). The RNC may also cause the term P to evolve in parallel with the evolution of the set point $SIR_{target}$ resulting from the external power control loop.

Each power $p_i$ resulting from (2), expressed relative to $P_{P-CPICH}$, is assigned by the RNC to the parameter $P_{ref}$ supplied to the corresponding transmitter in a DL POWER CONTROL REQUEST message, where applicable after eliminating each cell that satisfies condition (4) or (5). The processes (6) and (7) ensure that the relative transmitted power differences continue to be governed by the set differences between the values of $P_{ref}$, in other words, allowing for (2):

$$P_i - P_j \approx a_j - a_i = N0 \cdot \left(\frac{1}{L_j} - \frac{1}{L_i}\right)$$

The test (4) and the calculation (2) of the powers are applied by the RNC for each UE communicating with a plurality of cells, with a period for each in the order of a few seconds. Each time, the RNC uses the RRC protocol to recover the parameters N0 and $L_i$, and where applicable updates the value of P. The parameters $P_{ref}$ are then distributed to the Nodes B concerned. This optimizes the BER over all the active radio links in macrodiversity mode.

What is claimed is:

1. A method of controlling power of radio signals transmitted in macrodiversity mode from a plurality of radio transmitters of an active set to a radio terminal, the method comprising the steps of:
    estimating respective attenuation ratios of radio signals received by the terminal from the transmitters of the active set; and
    controlling at least some of the transmitters of the active set to transmit to the terminal at respective powers such that the difference $p_i - p_j$ between the respective transmission powers $p_i$ and $p_j$ of two transmitters i and j is substantially proportional to $$\frac{1}{L_j} - \frac{1}{L_i},$$

where $L_i$ and $L_j$, designate attenuation ratios estimated for transmitters i and j, respectively.

2. The method of claim 1, wherein said transmitters i and j are controlled so that said difference $p_i - p_j$ between the respective transmission powers is substantially equal to $$N0 \cdot \left(\frac{1}{L_j} - \frac{1}{L_i}\right),$$

where N0 is an estimate of the power of the noise affecting the receiving radio terminal.

3. The method of claim 2, further comprising the steps of:
    estimating a total power P to be transmitted to the terminal from the transmitters of the set;
    evaluating the sign of a quantity $$\frac{p}{n} - a_i + \frac{1}{n}\sum_j a_j$$

for each transmitter j of the active set, where n is the number of transmitters of the active set and for each transmitter j of the active set $$a_j = \frac{N0}{L_j};$$

and if the evaluated sign is negative, controlling the transmitter i not to transmit to the terminal.

4. The method of claim 3, further comprising the step of supplying the quantity $$\frac{p}{n} - a_i + \frac{1}{n}\sum_j a_j$$

as a parameter of a decision process for retaining the transmitter i in the active set or eliminating it therefrom.

5. The method of claim 1, wherein the steps of estimating the attenuation ratios and of controlling the transmitters of the active set are executed periodically.

6. A radio network controller for a cellular radio network infrastructure, comprising means for communicating with fixed radio transmitters serving respective cells and with at least one radio terminal and means for monitoring radio resources assigned to a call between the terminal and a plurality of radio transmitters belonging to an active set, wherein the radio resource control means comprise means for estimating respective attenuation ratios of radio signals received by the terminal from the transmitters of the active set in accordance with measurements relating to conditions of reception of said radio signals by the terminal and means for controlling at least some of the transmitters of the active set to transmit to the terminal at respective powers such that the difference $p_i - p_j$ between the respective transmission powers $p_i$ and $p_j$ of two transmitters i and j is substantially proportional to $$\frac{1}{L_j} - \frac{1}{L_i},$$

where $L_i$ and $L_j$ designate the attenuation ratios estimated for the transmitters i and j, respectively.

7. The radio network controller of claim 6, wherein said transmitters i and j are controlled so that said difference $p_i - p_j$ between the respective transmission powers is substantially equal to 26

$$N0 \cdot \left(\frac{1}{L_j} - \frac{1}{L_i}\right),$$

where N0 is an estimate of the noise received by the radio terminal.

8. The radio network controller of claim 7, wherein the radio resource control means comprise means for estimating a total power P to be transmitted to the terminal from the transmitters of the set and means for evaluating the sign of the quantity $$\frac{p}{n} - a_i + \frac{1}{n}\sum_j a_j$$

for each transmitter i of the active set, where n is the number of transmitters of the active set, and $$a_j = \frac{N0}{Lj}$$

for each transmitter j of the active set, the transmitter i being controlled not to send to the terminal if the evaluated sign is negative.

9. The radio network controller of claim 8, wherein the radio resource control means comprise active set determination means receiving the quantity $$\frac{p}{n} - a_i + \frac{1}{n}\sum_j a_j$$

as a parameter to eliminate from the active set a transmitter for which said parameter is negative.

* * * * *